United States Patent

Bailey et al.

[11] Patent Number: 5,840,849
[45] Date of Patent: Nov. 24, 1998

[54] BLENDS OF COLLAGEN TYPE I AND COLLAGEN TYPE III FOR FOOD CASINGS

[75] Inventors: A J Bailey, Bristol, Great Britain; Michaël de Mari; Bettina Schmidl, both of Wormerveer, Netherlands; Fransiscus Aloysius Timmermans, Oss, Netherlands

[73] Assignee: Loders Croklaan B.V., Wormerveer, Netherlands

[21] Appl. No.: 902,162

[22] Filed: Jul. 29, 1997

[30] Foreign Application Priority Data

Jul. 29, 1996 [EP] European Pat. Off. .............. 96305547

[51] Int. Cl.$^6$ .............................. A61K 38/17; A23L 1/31; A23J 3/00
[52] U.S. Cl. .......................... 530/356; 530/402; 530/425; 530/426; 530/427; 426/32; 426/59; 426/92; 426/105; 426/135; 426/138; 426/140; 426/277; 426/533; 426/652; 426/656; 426/657
[58] Field of Search ..................................... 530/356, 402, 530/425, 426, 427; 426/32, 59, 92, 105, 135, 138, 140, 277, 533, 652, 656, 657

[56] References Cited

U.S. PATENT DOCUMENTS

| | | | |
|---|---|---|---|
| 3,529,530 | 9/1970 | Tsuzuki | 99/18 |
| 3,664,844 | 5/1972 | Miller | 99/18 |
| 3,894,158 | 7/1975 | Miller | 426/277 |
| 4,359,481 | 11/1982 | Smits et al. | 426/533 |
| 4,407,829 | 10/1983 | Sjölander | 426/59 |
| 4,615,889 | 10/1986 | Fu Lu et al. | 426/140 |
| 5,162,430 | 11/1992 | Rhee et al. | 525/54.1 |
| 5,229,497 | 7/1993 | Boni | 530/356 |

FOREIGN PATENT DOCUMENTS

| | | |
|---|---|---|
| 0 479 702 A2 | 4/1992 | European Pat. Off. . |
| 2.226.932 | 11/1974 | France . |
| 2 657 352 | 7/1991 | France . |
| 1 960 935 | 9/1970 | Germany . |
| WO 81/03260 | 11/1981 | WIPO . |
| WO 90/05755 | 5/1990 | WIPO . |

OTHER PUBLICATIONS

Sims et al., *Journal of Chromatography*, vol. 582, pp. 49–55, 1992.
Robins et al., *Biochem. J.*, vol. 13, pp. 771–780, 1973.
Black et al., *Analytical Biochemistry*, vol. 169, pp. 197–203, 1988.

*Primary Examiner*—Cecilia J. Tsang
*Assistant Examiner*—Abdel A. Mohamed
*Attorney, Agent, or Firm*—Pillsbury Madison & Sutro LLP

[57] ABSTRACT

Blends of collagen type I and collagen type III having crosslinks of the pyridinoline (Pyrid), dihydroxylysinonorleucine (DHLNL) and histidinohyroxylysinonorleucine (HHL) types, wherein the amounts of the crosslinks satisfy the ratio: (Pyrid+DHLNL)/HHL=0.4–6. Collagen blends with these crosslinking ratios make excellent casings with improved properties for food products, particularly sausages.

11 Claims, No Drawings

BLENDS OF COLLAGEN TYPE I AND COLLAGEN TYPE III FOR FOOD CASINGS

BACKGROUND OF THE INVENTION

Collagen is often used according to the disclosures in the prior art as a component for sausage casings. Depending on the source of the collagen and the molecular composition many different types of collagen are known. A summary of the most common types is given in Bailey and Light, Connective tissue in meat and meat products, Elsevier Applied Science, 1989, table 2.1 on page 28.

Although types I and III are used in sausage casings in industry, it was found that the use of these collagen types still had a number of drawbacks. E.g. it was found that the use of type I gave a very poor bite or snap of the sausage, while also the skin smoothness of the sausage was very moderate and did not fulfil the commercial requirements for a good product. The use of tissue, containing a high proportion of type III led to very poor results with respect to sterilisation stability, machinability, beltmarks and open sausage ends. Therefore a great demand existed to develop an improved component for the use in sausage casings.

SUMMARY OF THE INVENTION

We performed a study in order to find out whether such a component could be found. This study resulted in the finding of a novel blend of collagen that does not display the drawbacks of the collagen of the prior art. Above finding is based on the fact that we found that for a good performance of collagen as a component for a sausage casing the presence of specific types of crosslinks is essential, whereas other types of crosslinks should be present in small amounts only. It is known that the different types of collagens can have different types of crosslinks.

Heatstable crosslinks that are identified in collagens are e.g. hydroxylysinopyridinoline (=Pyrid), histidinohydroxylysino norleucine (=HHL) and dihydroxylysinonorleucine (=DHLNL). These types of crosslinks and methods to measure them quantitatively are disclosed in the following references: Simms and Bailey, J. Chrom. (1992) 582, p. 49–55; Black c.s. Anal. Biochem. 169, p. 197 and Robins c.s. Biochem. J. 131, p. 771.

DETAILED DESCRIPTION OF THE INVENTION

According to our new finding the collagen should be a blend of different types of collagen, which blend comprises cross linkings of the types Pyrid, DHLNL and HHL in such amounts that the weight ratio:

(Pyrid+DHLNL)/HHL=0.04–6, preferably 0.5–5, most preferably 1–4.

The use of such a collagen blend in sausage casings avoids all the drawbacks of the known casings, while even synergism is found over the independent use of the two types of collagen in sausage casings.

In order to achieve the desired effect it is necessary to have a minimum amount of cross linkings in the collagen blend. The amount of cross linking is expressed as mole of cross links per mole of collagen.

The measurement of the amount of different cross links present can be performed according to prior art methods as mentioned above. This methodology is based on reducing a sample of the collagen with sodium borohydride, hydrolysing the resulting product with HCl, freeze drying the product and dissolving it in water. The product is now analysed on a flow auto-analyser (Chem Lab) for its hydroxyproline content. Another part of the product is pre-fractionated on CF1-cellulose, using glacial acetic acid and butan-1-ol. This results in an organic phase containing water, acetic acid and butanol. The non-crosslinking amino acids are eluted with the organic phase, whereas the crosslinked amino acids remain adsorpted. The effluent is discarded, while the adsorbed amino acids are eluted with water. The product is centrifuged, whereupon the lower water layer is separated, isolated and freeze dried, the product resulting herefrom is dissolved in acid, the solution is filtered and the product is analysed on an amino acid analyser, configured for the separation of collagen crosslinks. The content of the different crosslinks can now be calculated from the data obtained.

We found that if the total amount of crosslinks (Pyrid+DHLNL+HHL) is at least 0.1, preferably >0.3, most preferably 0.3–0.6 mole crosslinks/mole collagen excellent results were obtained. Although higher and lower amounts were also possible, we found that the optimal results were obtained in above range.

The blend according to the invention can be obtained by blending the appropriate collagen types in the appropriate amounts. However a very convenient way to make these blends is to mix the collagen types I and III, preferably in ratio's of 90:10–75:25 (wt/wt).

Although the collagens can be obtained from different sources such as fish, bovine, pig and turkey, both from the skin, the bones and the tendons, we prefer to apply bovine hide as source for our collagen type I and to apply animal intestines as source for collagen type III. It is however also possible to derive this collagen from other internal organs, such as lungs and the stomach. In the case we use collagen from intestines we prefer to subject the intestines first to an enzymic treatment, preferably using a proteolytic enzyme, such as pepsin or alkalase. By this treatment the non-collagen-meat proteins are degraded and an improved collagen can be isolated.

In order to make a casing a collagen dough must be prepared first. These collagen doughs will comprise organic and inorganic acids generally in amounts of 1.0% to 6.0%, which amount is sufficient to bring the pH to below 3.0, the collagen blend according to the invention to a collagen-protein content of 1–20, preferably 3.0 to 14.0%, most preferably 3.5–7.0% and water (balance to 100%).

These collagens doughs may also contain 0.5 to 3.0% cellulose fibers and 0.25% to 1.0% cellulose ethers, preferably methylcellulose.

From these doughs casings are made by coextrusion. Just prior to coextrusion a liquid smoke or another cross-linking agent-containing substance may be mixed into the collagen dough at a ratio of 2 to 8%, preferably 3–6%.

Our invention also comprises the casings that can be made from our collagen blend or our collagen dough. These casings have excellent properties for an application in the production of cased food products (meat sausages, fish fingers, cheese sticks, etc.) Therefore food products, in particular meat or meat-like products provided with our casing are also part of our invention.

The cased food products can be treated by spraying with or dipping in liquid smoke concentrate, to stabilise the casing by cross-linking the collagen protein fibres and to impart a smoke flavour to the products. A very useful smoke concentrate is disclosed in our U.S. Pat. No. 4,359,481. According to another embodiment of our invention our collagen blends or our collagen doughs can be applied for the improvement of the sterilisation stability and/or belt marks and/or bite or snap and/or machinability and/or skin smoothness and/or the occurence of open sausage ends of cased meat products.

Sterilisation stability is defined here as the ability of a casing to withstand sterilisation conditions.

Belt marks is defined as the visable prints in the casing as a result of the use of a transport belt during the drying process of the cased sausages.

Bite or snap is defined as the snap impression during the first bite of the sausage.

Machinability is defined as the ability of the casing to be transported with high speed during the production of the cased meat products.

Skin smoothness is defined as the ablity of the casing to form a smooth and glossy surface around the ready meat product.

Open sausage ends is defined as the ability of the casing to avoid the occurrence of open ends due to shrinkage of the casing during the processing.

A last embodiment of our invention is that to our collagen blend or in our collagen dough or in our casings or in our cased meat products additional cross linking agents are added c. q. present as part of the collagen blend. Useful cross linking agents are:glutaraldehyde or hexamethylene diisocyanate.

EXAMPLES

1. Different collagen doughs were prepared from different collagens or collagen blends. A summary is given below:

| dough number | I | II | III | IV | V | VI |
| --- | --- | --- | --- | --- | --- | --- |
| % collagen in dough | 4.0% | 4.0% | 4.0% | 4.0% | 4.0% | 4.0% |
| weight % collagen dough/total weight of sausage | 5% | 4.3% | 4.3% | 4.3% | 7% | 7% |
| % Collagen type-I | 100 | 87 | 83 | 80 | 73 | 66 |
| % Collagen type-III | — | 13 | 17 | 20 | 27 | 33 |

From these doughs sausage casings were made by co-extrusion, resulting in casings I–VI. These casings were evaluated on their properties as represented in the table below:

TABLE

| casing nr. | I | II | III | IV | V | VI |
| --- | --- | --- | --- | --- | --- | --- |
| sterilisation stab. | 10 | 10 | 10 | 10 | 1 | 1 |
| belt marks | 7 | 9 | 9 | 9 | 4 | 4 |
| skin smoothness | 6 | 9 | 9 | 9 | 7 | 7 |
| open sausage ends | 8 | 8 | 7 | 7 | 4 | 4 |
| bite/snap | 2 | 6 | 7 | 7 | 8 | 8 |
| machinability | 8 | 8 | 8 | 8 | 2 | 2 |

The samples were judged and given a number between 1 and 10
1=bad
10=perfect

It will be obvious from above table that our new products are superior over the prior art products. We even found better improvements than could be expected on basis of the properties of the individual components, note in particular machinability, belt marks, bite/snap and skin smoothness.

Summary of ratio (Pyrid+DHLNL)/HHL for the different collagens.

| collagen in dough nr. | I | II | III | IV | V* | VI |
| --- | --- | --- | --- | --- | --- | --- |
| ratio | 0.034 | 0.85 | 1.28 | 1.65 | infinite | 6.01 |

*no or only traces of HHL present.

2. Preparation of a collagen dough

The collagen was after mixing with water comminuted to a very fine suspension of collagen fibres. After deaeration and homogenisation the pH was adjusted to pH <3 by addition of acetic acid. The collagen fibres swelled as a result of this pH-adjustment. A collagen dough was obtained containing the amount of collagen mentioned in example 1.

3. Preparation of collagen type I 3000 kg of hide-split collagen were introduced in a rotating drum processor (Dosemat®). After washing, de-liming (with acetic acid: pH:4.81) and washing again the product was equilibrated for 4 hrs with a saturated sodium sulfate solution. The product resulting hereof was alkali-treated (1N NaOH) and neutralised (aq. acetic acid) for 2,5 hrs. The product was washed. The washed product is collagen type I.

4. Preparation of collagen type III

Pig intestines were mixed with water and then enzyme treated with Alcalase at 4° C. at a pH 8.3 for 2 hours. After neutralisation to pH 5.5 the collagen was separated from the liquid by a decanter centrifuge.

We claim:

1. A blend of collagen type I and collagen type III having different types of cross-linkings,
    wherein the blend comprises cross-linkings of the hydroxylsino-pyridinoline (Pyrid), dihyroxylsinonorleucine (DHLNL) and histdinohydrdoxylysinonorleucine (HHL) types, in amounts satisfying the weight ratio:

Pyrid+DHLNL/HHL=0.04–6;

wherein the collagen type I is derived from bovine hides, and the collagen type III is derived from animal intestines; and
    wherein the blend comprises collagen type I and collagen type III in a weight ratio of 90:10 to 75:25.

2. A blend of collagens according to claim 1, wherein the blend contains a total amount of Pyrid+DHLNL+HHL from about 0.1–0.6 mole/mole collagen.

3. A blend of collagens according to claim 1, wherein the collagen type III is collagen obtained from animal intestines subjected to proteolytic enzymatic treatment to degrade non-collagen proteins prior to the isolation of collagen.

4. A method of improving casing properties of cased meat products, comprising the steps of:
    preparing a meat casing comprising a collagen blend according to claim 1, and
    filling said casing with a meat product,
    wherein the improved casing properties comprise sterilisation stability, belt marks, bite or snap, machinability or skin smoothness of cased meat products.

5. A blend of collagen according to claim 1 further comprises additional cross linking agents selected from the group consisting of f glutaraldehyde and hexamethylene diisocyanate.

6. A blend of collagen type I and collagen type III according to claim 1, wherein the crosslinking weight ratio Pyrid+DHLNL/HHL=1–4.

7. A collagen dough, comprising water, acid and collagen, wherein the collagen blend according to claim 1 is present in amounts satisfying a collagen content of the dough of 1–20wt %, while water is present bringing the total wt % to 100%.

8. A method of improving casing properties of cased meat products, comprising the steps of:

preparing a meat casing comprising a collagen dough according to claim 7, and filling said casing with a meat product, wherein the improved casing properties comprise sterilisation stability, belt marks, bite or snap, machinability or skin smoothness of cased meat products.

9. A casing for a meat product, wherein the casing comprises the collagen dough according to claim 7.

10. A cased meat product, comprising a casing of claim 9 around a meat-containing filling.

11. A cased meat product according to claim 10, further comprises a liquid smoke concentrate.

* * * * *